3,504,633
NEUTRAL BURNING GAS GENERATOR GRAIN
Robert K. Jefferies and Philip Albanese, Waco, Tex., assignors to North American Rockwell Corporation, a corporation of Delaware
Filed Jan. 24, 1967, Ser. No. 611,403
Int. Cl. F42b 1/00
U.S. Cl. 102—99                                    6 Claims

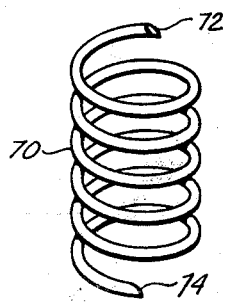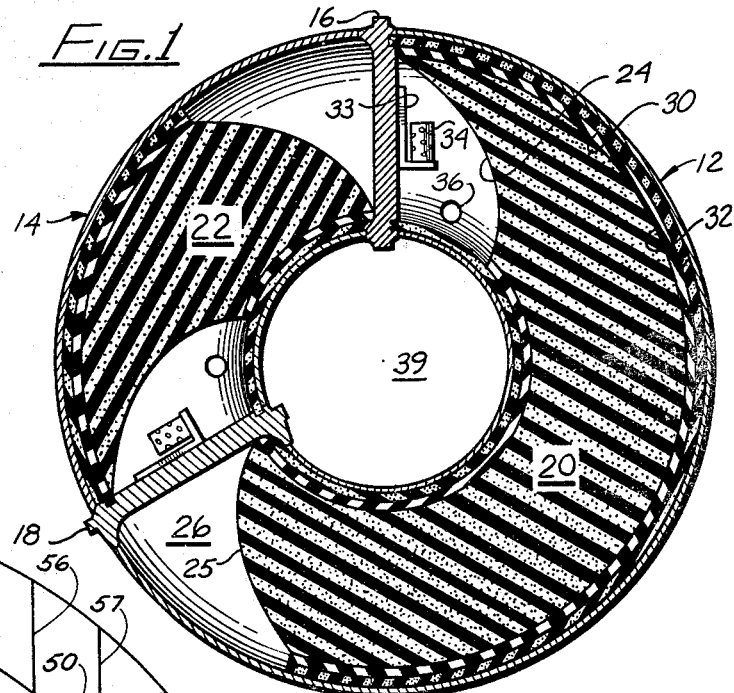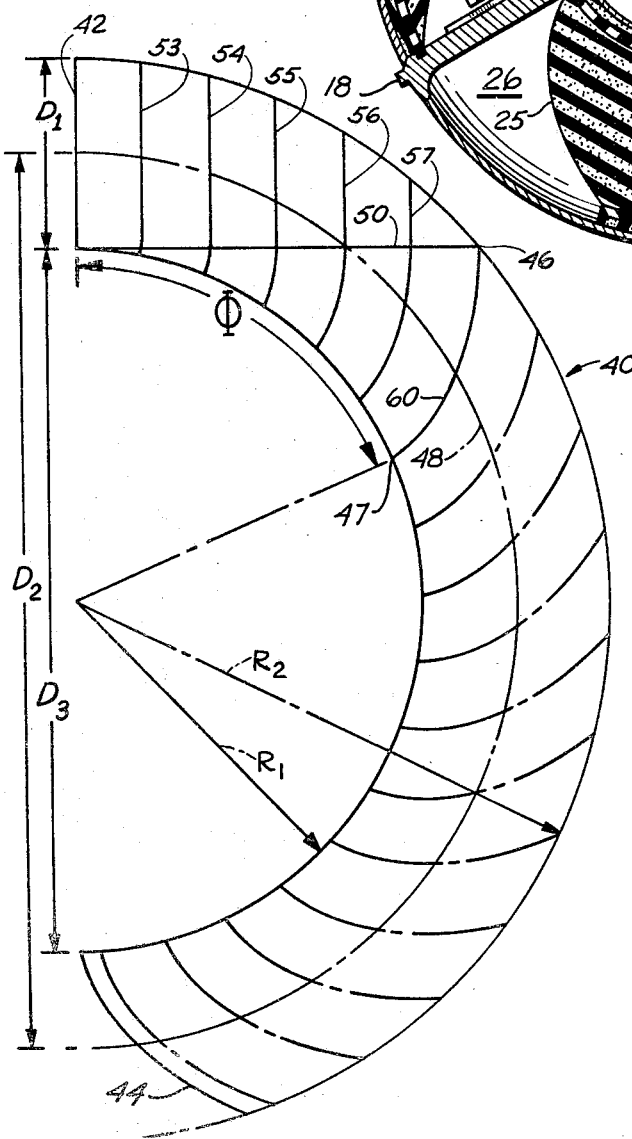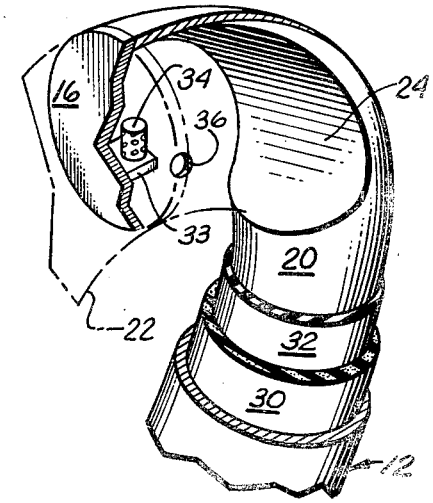
INVENTOR.
ROBERT K. JEFFERIES
PHILIP ALBANESE
BY Thomas S. MacDonald
ATTORNEY United States Patent Office 3,504,633
Patented Apr. 7, 1970

ABSTRACT OF THE DISCLOSURE

A curvilinear, gas-generating end-burning solid grain which has a constant bending radius and achieves neutral burning, since both the initial and terminal burning surfaces are contoured to a concave involuted shape.

---

This invention relates to gas generators, and more particularly to a unique design for gas generating solid grains.

The use of solid grains of various shapes to generate gas is well known in the prior art. Their shapes are primarily dictated by the required gas generation rate which is a function of an ascertainable burning rate multiplied by burning surface area. The term grain, as used in the context of this invention, means a solid charge of mixed oxidizer and fuel materials shaped into a suitable geometrical pattern, the charge being designed to generate gases as it is burned. Gas generation rates can be variable, either progressive or regressive, or neutral meaning that the burning surface area remains very constant throughout the burning period.

One type of grain is formed centrally with an aperture that may be star or cruciform shaped or the like, the grain wall defining the aperture constituting the initial burning surface. This type of design inherently produces structural weaknesses in the grain. Another type of grain, which the instant invention is more closely related to, is the end burning type. A conventional grain of the latter type is of right cylindrical shape that burns either at a variable or neutral rate from end to end depending upon whether its cross-section is irregular or constant. End burning grains are bulky and difficult to store or assemble in spaces which provide adequate volumes but are non-cylindrically shaped.

When the only available space is annular and a neutral burning grain of predetermined gas generating characteristics is required, then exacting problems are posed. By conventional practices either the space must be redesignated to accommodate the grain which is costly and time consuming or else the needed gas generating characteristics including the neutral burning aspect cannot be achieved. A need exists therefore to make the geometries of a neutral burning grain and a fixed annular space complementary with one another. This will result in maximum utilization of available space and a more compact overall structure.

The instant invention solves the problem of installing a neutral burning gas generator grain into an annular space whose dimensions cannot accommodate the shapes of conventional cylindrical grains of equivalent burning times. The grain design formed in accordance with this invention can be easily looped over or partially wrapped around components such as a shaft that defines a portion of the available space in which the grain must be confined.

Briefly described, this invention is an end burning solid grain of curvilinear geometry characterized by a constant radius of bend throughout its length. The geometry is preferably a toroid but may be spiral or the like, the important feature being that the shape should be characterized by a constant bending radius. Preferably the initial burning surface is specially contoured to a concave involuted shape so that neutral burning proceeds continuously throughout approximately the entire length of the grain until the grain is totally consumed. When the terminal burning surface is contoured in the same manner then neutral burning is not interrupted in the final burning stages. When the initial burning surface is not specially contoured but is, in fact, planar and normal to the grain axis, burning is progressive for a computable distance but simultaneously seeks and ultimately achieves neutral burning surface. Once the neutral burning surface is attained, neutral burning proceeds continuously.

Accordingly, an object of this invention is to provide an end burning gas generating grain which is curvilinear in shape and capable of neutral burning.

The above object as well as additional objects will be fully understood when the following detailed description is studied in conjunction with the detailed drawings in which:

FIG. 1 is a cross-sectional view of one embodiment of a curvilinear, torus-shaped neutral burning grain formed in accordance with this invention.

FIG. 2 is a fragmentary perspective view of one of the initial burning surfaces associated with the embodiment shown in FIG. 1.

FIG. 3 is a schematic view of a grain similar to the embodiment shown in FIG. 1 and will be referred to in explaining how the neutral burning effect is achieved.

FIG. 4 is a schematic view of a second embodiment of a curvilinear, spiral-shaped neutral burning grain formed in accordance with this invention.

Referring now to the drawings and more particularly to FIG. 1 and FIG. 2, there is shown a gas generator 10 which is of toroid or doughnut shape. Generally, gas generators furnish a source of power in the form of hot gases, which, among numerous applications, can be used for (1) producing reaction forces for controlling missiles in their flight path, (2) expelling fluid from expulsion tanks, (3) driving turbine wheels, (4) actuating turbopumps, etc. In the first case the grain would be called a propellant grain. In neutral burning grains any unexpected progressive or regressive burning rate would tend to disrupt the required performance. However, when the only available space in which the grain must be stored is annular or ring-shaped, conventional grains must either have their mass modified or else their shape modified in which case neutral burning can no longer be achieved. In either case, previous attempts to fit a neutral burning grain to an annular space without suffering serious penalties have been unsuccessful.

In the embodiment of the invention, depicted in FIG. 1, gas generator 10 includes a pair of arcuate tubular casing sections 12 and 14 which together constitue a complete tours. Partial toroidal sections may also be employed as the total gas generator. Casings 12 and 14 have their ends oriented in adjacent relationship and are compartmentalized from one another by a pair of circular anchoring plates 16 and 18 to which the casing ends are secured by any suitable means such as welding or bolting. Contained in casings 12 and 14 are gas generating solid grains 20 and 22, respectively. Both grains 20 and 22 are toroid segments of constant cross-sectional area. They are constructed of any suitable grain material such as ammonium nitrate and a rubbery binder. A specific example is a grain of 77 weight percent amomnium nitrate and 23 weight percent of butadiene/methylvinylpyridine in a 90/10 ratio.

Grains 20 and 22 can be burned simultaneosuly or successively but in either case are burned independently of one another. In order to avoid duplication of explanation since the burning characteristics and operations of grains 20 and 22 are substantially identical, the description of the invention will proceed with regard to only grain 20. Mounted on an elbow-shaped brace 33 fixed to plate 16 is an igniter flame tube 34. A gas discharge nozzle 36 is formed in the wall of casing 12. Adjacent igniter flame tube 34, grain 20 has an initial burning surface 24. At its opposite end, grain 20 is formed with a terminal burning surface 25 which is contoured so as to be complementary with respect to initial burning surface 24. Interposed between terminal burning surface 25 and plate 18 is a mass of suitable inert filler 26.

Surrounding grain 20 in contiguous relationship is a layer of charring inhibitor 32 such as nonoxidized propellant binder material.

Disposed between inhibitor layer 32 and casing 12 is a layer of insulation 30 such as an asbestos loaded rubber, non-oxidized.

Grain 20 is designed to be neutrally burned from initial burning surface 24 to terminal burning surface 25. The special concave involuted or dished-in contouring of initial burning surface 24 is designed to assure a burning area that will remain constant as the burning area recedes to a point adjacent terminal burning surface 25. And in a similar manner, the complementary dished-out contouring of terminal burning surface 25 assures that the burning surface area will remain constant as the final portion of grain 20 is consumed. As best shown in FIG. 2, surface 24 does not curve in the axial direction; i.e., straight lines parallel the axis of generator 10 would not intersect surface 24. The contouring of initial and terminal burning surfaces 24 and 25 is an important aspect of this invention and the manner in which these surfaces are determined will subsequently be explained. Central space 39 defined by the interior wall of toroid-shaped gas generator 10 enables it to be stored in annular spaces without impairing the neutral burning characteristics of grains 20 and 22. It should be noted that a torus segment such as grain 20 alone or grain 22 alone can be wrapped around a component associated with the structure in which either grain 20 or 22 is to be installed. The dimensions of the arc defining the grain is primarily dictated by the required gas generation rate and the period of time during which a supply of generated gas is needed.

The manner in which the contouring of initial burning surface 24 is ascertained will now be explained with reference to FIG. 2. It was previously thought that the burning surface area of a toroid shaped grain would become progressively and most likely erratically enlarged causing an uncontrollable pressure increase. Such would be accompanied with the adverse result that desired neutral burning would be unobtainable. However, it has unexpectedly been discovered that this thought is not entirely correct. When a toroid shaped grain of circular cross-section is initially burned on a surface which is planar to the axis of the grain, the burning is, in fact, progressive but such is limited to a computable distance. Beyond this distance the burning surface area remains constant and hence neutral burning is achieved. During the initial progressive burning stage, the burning surface area is seeking a constant burning surface area which once obtained is maintained as the remainder of the grain is consumed. Grain 40 is a torus segment of constant circular cross-section and has an initial bunring surface 42 defining a plane that is perpendicular to grain axis 48. When surface 42 is burned, burning proceeds at a progressive rate from surface 42 to stage 53 and then from stage 53 through stage 60. Stage 60 represents the neutral burning surface. As the burning surface of grain 40 recedes from initial neutral surface 60 through terminal surface 44 the burning area remains constant so that the pressure of the generated gas also remains steady. Line 50 represents a plane perpendicular to surface 42 and passes through the outer zone 46 of neutral surface 60.

The area of neutral burning surface 60 and the distance of the progressive burning zone between surfaces 42 and 60 can be computed from the following formulas.

The area of neutral burning surface 60 can be computed from the following equation:

$$A_b = \frac{0.7854(D_1)^2(D_2)}{D_3}$$

wherein:

$A_b$—propellant neutral burning surface area (square inches)
$D_1$—diameter of grain cross section (inches)
$D_2$—mean diameter of the toroid
$D_3$—inside diameter of the toroid (inches)

The progressive burning distance between initial burning surface 42 and inner zone 47 of neutral burning 60 is expressed in terms of radians $\Phi$. The formula for computing this distance is as follows:

$$\Phi = \frac{1}{R_1}\sqrt{R_2^2 - R_1^2}$$

where:

$\Phi$ is the angle between initial flat circular area 42 and inside zone 47 of neutral burning surface 60,
$R_1$ = the radius between the toroid center and the innermost wall section of the grain (toroid inner radius),
$R_2$ = the radius between the toroid center and the outermost wall section of the grain (toroid outer radius).

Thus in accordance with this invention and the foregoing formulas the successive progressive and neutral burning distances of any toroid shaped grain of circular cross-section can be easily computed. The progressive burning zone can, however, be totally eliminated by contouring the initial burning surface of the grain so as to conform to the neutral burning surface that can be easily computed. When the terminal or final burning surface of the grain is contoured so as to be complementary to the initial burning surface, then regressive as well as progressive burning will be totally eliminated. Thus if neutral burning is required throughout the length of a grain, both the initial and terminal ends should be contoured. However, where neutral burning is required only through a predetermined distance, then neither the initial nor terminal surfaces would need to be contoured.

A second embodiment formed in accordance with this invention, as shown in FIG. 3, is a grain 70 having a generally spiral shape from its initial burning surface 72 to its terminal burning surface 74. As in the case of the toroidal shaped grain, shown in FIGS. 1 and 2, spiral shaped grain 70 is characterized by a constant bending radius. When the cross-section of grain 70 is circular then a dished-in neutral burning surface can be contoured at initial burning surface 72. As long as the geometry of the gas generating grain describes a curve having a constant radius, the principles underlying the instant invention will serve to achieve neutral burning. It can be seen that spiral shaped grain 70 can be installed in a complementary elongated annular storage space.

We claim:

1. A gas generating solid grain comprising;
   an end-burning toroidal shaped grain formed with initial and terminal burning surfaces and having a constant circular cross-sectional area, and
   means defining a concave involuted surface on the initial burning surface and means forming a concave involuted surface on the terminal burning surface which is complementary to the contouring of the initial burning surface so that the grain can be neutrally burned throughout its entire length.

2. The structure according to claim 1 wherein the initial burning surface is of concave involuted shape sufficient to achieve neutral burning throughout the length of the grain to a point adjacent the terminal burning surface.

3. The structure according to claim 2 wherein the terminal burning surface is contoured to complement the initial burning surface sufficient to achieve neutral burning throughout the entire grain.

4. The structure according to claim 1 wherein the grain is of toroid configuration having a circular cross-section and the initial burning surface is of concave involuted shape for neutral burning having an area determined by the formula:

$$A_b = \frac{0.7854(D_1)^2(D_2)}{D_3}$$

where:

$A_b$—the area of the neutral burning surface
$D_1$—diameter of the grain cross-section
$D_2$—mean diameter of the toroid
$D_3$—inside diameter of the toroid 5. A gas generating solid grain capable of being neutrally burned throughout a portion of the length wherein said grain is of toroid configuration having a circular cross section, and, when the initial burning surface is perpendicular to the grain axis the angle between initial burning surface and a neutral burning surface is determined by the formula;

$$\Phi = \frac{1}{R_1}\sqrt{R_2^2 - R_1^2}$$

where:

$\Phi$=the angle expressed in radians between the initial burning surface and the innermost section of the neutral burning surface
$R_1$=toroid inner radius
$R_2$=toroid outer radius 6. The method for making a neutral burning gas generating grain comprising the steps of;
forming an end-burning grain with a curvilinear configuration having a constant cross-sectional area and a constant bending radius throughout its length, and
contouring the initial burning surface with a concave involuted shape to constitute a neutral burning surface.

References Cited

UNITED STATES PATENTS 3,201,936   8/1965   Bancelin _____ 102—103

BENJAMIN A. BORCHELT, Primary Examiner

S. C. BENTLEY, Assistant Examiner